UNITED STATES PATENT OFFICE.

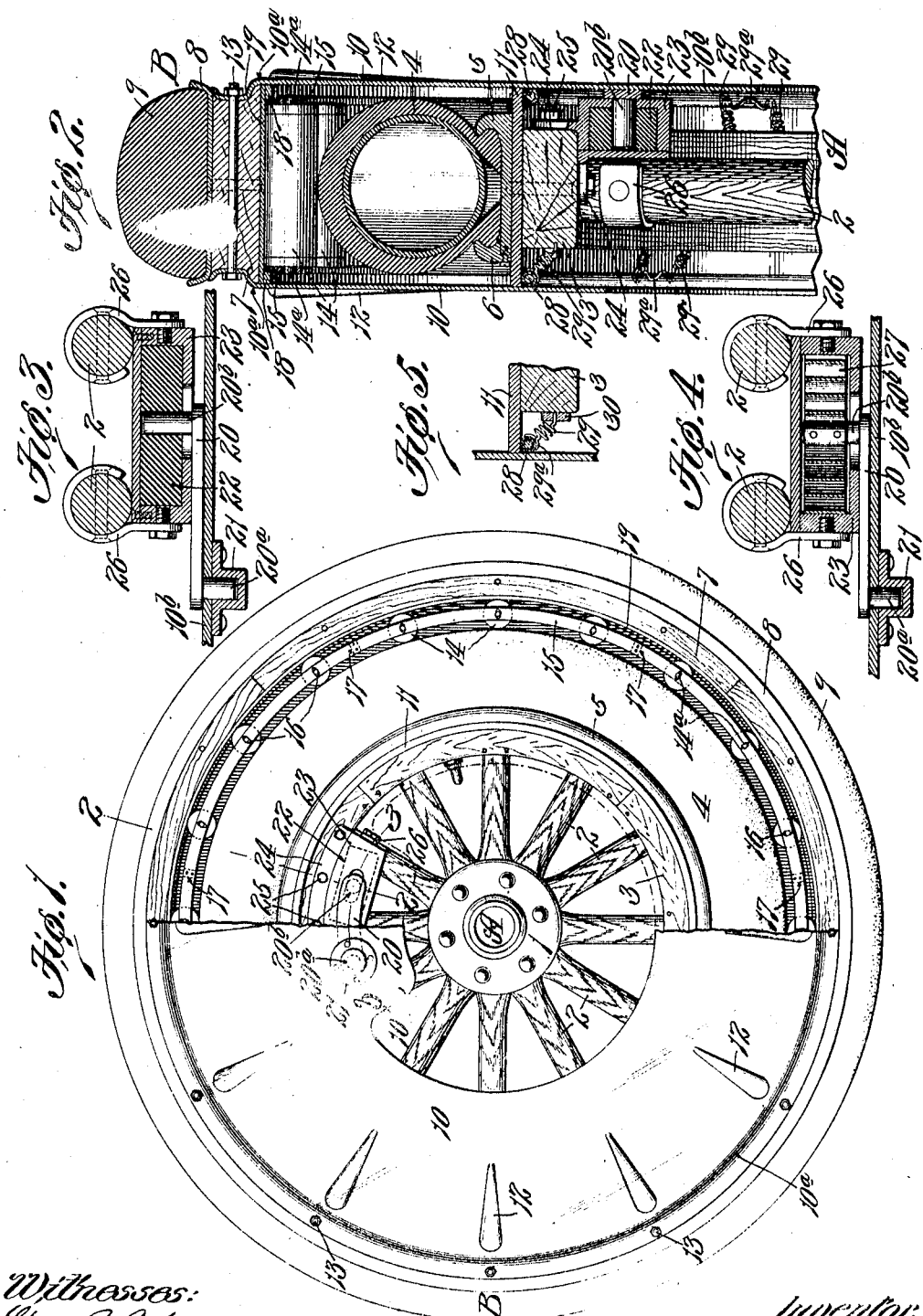
N. SCHENK.
RESILIENT WHEEL.
APPLICATION FILED AUG. 31, 1910.
1,019,846. Patented Mar. 12, 1912.

NICHOLAS SCHENK, OF ST. LOUIS, MISSOURI.

RESILIENT WHEEL.

1,019,846.  Specification of Letters Patent.  Patented Mar. 12, 1912.

Application filed August 31, 1910. Serial No. 579,900.

*To all whom it may concern:*

Be it known that I, NICHOLAS SCHENK, a citizen of the United States, residing at St. Louis, Missouri, have invented a certain new and useful Improvement in Resilient Wheels, of which the following is a full, clear, and exact description, such as will enable others skilled in the art to which it appertains to make and use the same.

This invention relates to resilient wheels of that type which are provided with a cushion arranged between a hub section and a rim section that can move relatively to each other in a vertical plane.

One object of my present invention is to provide a wheel of the type referred to which is so designed that a comparatively large cushion can be used and thus impart a great degree of resiliency to the wheel. Another object is to provide a wheel of the type referred to which is so designed that the side thrusts are applied to the rim section at a point quite near the periphery of the wheel. And still another object is to provide a wheel of the type referred to whose external appearance resembles an ordinary automobile wheel.

Other objects and desirable features of my invention will be hereinafter pointed out.

Figure 1 of the drawings is a side elevational view of a wheel constructed in accordance with my invention, a portion of one of the side plates of the rim section being broken away so as to more clearly illustrate the construction of certain parts of the wheel; Fig. 2 is an enlarged sectional view taken on approximately the line 2—2 of Fig. 1; Fig. 3 is an enlarged sectional view taken on approximately the line 3—3 of Fig. 1; Fig. 4 is a sectional view similar to Fig. 3 illustrating a different kind of buffer; and Fig. 5 is a detail sectional view illustrating another way in which the springs of the dust and water protecting ring can be connected to the felly of the hub section.

Referring to the drawings which illustrate the preferred form of my invention, A designates the hub section of the wheel which consists of a hub 1 provided with radially disposed spokes 2 whose outer ends are connected to a felly 3 on which a cushion 4 is mounted. Any suitable kind of cushion can be arranged on the felly of the hub section but I prefer to use a pneumatic tire that is connected to a quick-detachable rim composed of a permanent portion 5 that is connected to the felly 3 of the hub section and a removable portion 6 that is detachably connected to said permanent portion.

The rim section B of the wheel consists of a felly 7 provided with a substantially channel-shaped rim 8 in which a tire 9 is mounted, and a pair of ring-shaped plates 10 connected to said felly 7 and projecting inwardly toward the hub section for holding said hub section and rim section in vertical alinement with each other, the felly 3 of the hub section being provided with a substantially flat ring 11 whose side edges bear against the inner faces of the ring-shaped plates 10 on the rim section. The ring-shaped plates 10 on the rim section are made stiff enough to prevent them from bending laterally when they are subjected to end thrusts, and said plates can either be formed from cast metal or from sheets of rolled metal provided with radially-disposed strengthening ribs 12. Any suitable means such, for example, as bolts 13, can be used for connecting the plates 10 to the felly 7 of the rim section, and if desired, said plates can be offset at $10^a$, as shown in Fig. 2, so that they will project far enough beyond the ends of the bolts 13 to prevent the heads or nuts on said bolts from being sheared off in case the side face of the wheel scrapes against a curbstone or other object. The rim section could be formed in various other ways, however, so that I do not wish it to be understood that my invention is limited to the exact construction herein shown.

A number of devices, preferably rollers 14, are arranged between the cushion 4 and the felly 7 of the rim section, and said devices are connected together in such a manner that they can travel around the cushion or shift relatively thereto and thus prevent the cushion from wearing out as would be apt to occur if said devices always bore on the same portions of the cushion. The means herein shown for connecting the rollers together consists of a pair of hoops or rings 15 provided with elongated slots 16 which receive trunnions $14^a$ on the rollers, said hoops being connected together by tie bars 17 or other suitable devices that prevent one hoop from moving relatively to the other and thus causing the rollers to twist. The rollers 14 can be of any preferred shape in cross section and formed from any suitable material, and ring-shaped stops 18 are connected to the inner face of the felly 7 of the rim section adjacent the side edges thereof, as shown in Fig. 2 so as to limit the transverse movement of the rollers relatively to said felly. If the felly 7 is formed of wood, as herein shown, it is preferable to arrange a metal ring 19 on the inner face of same so as to form a track for the rollers 14.

The rotary movement of the hub section is transmitted to the rim section by means of one or more links 20 connected to said hub and rim sections. In the embodiment of my invention herein shown, one of the side plates 10 of the rim section is provided with an inwardly projecting extension 10$^b$ having an opening formed therein for receiving a trunnion 20$^a$ on one end of the link 20, the outer end of said trunnion being protected by a cap 21 that is connected to the extension 10$^b$ of the side plate, said cap forming a long bearing surface for the trunnion 20$^a$ and also reinforcing and strengthening that portion of the side plate through which said trunnion projects. The link 20 is provided at its opposite end with a trunnion 20$^b$ which projects into some portion of the hub section, preferably into a yielding buffer 22 arranged inside of a box or hollow member 23 that is secured to the felly 3 and spokes 2 of the hub section. The buffer shown in Figs. 2 and 3 consists of a block of rubber provided with an opening for receiving the trunnion 20$^b$, as shown in Fig. 3, and the box 23 in which said buffer is arranged is provided with flanges 24 that bear against the inner surface and one of the side faces of the felly 3, fastening devices 25 passing through said flanges into the felly for connecting the box 23 thereto. If desired, the box 23 can be provided with hooks 26 which embrace two of the spokes of the hub section so as to more securely connect said box and the hub section together, one wall of the box being removable so that the buffer can be introduced into same.

By yieldingly connecting the hub and rim sections together in the manner above described, I prevent the rim section from receiving sudden shocks and strains when the hub section is stopped or started quickly, and I thus reduce the liability of breaking the connection or means which transmits rotary movement from one section to the other, a yielding connection of this description also being desirable in view of the fact that it compensates for any uneven twisting strains which one section of the wheel might receive in service. Instead of using a rubber buffer of the kind shown in Fig. 3 I can use a buffer consisting of a coiled flat spring 27, as shown in Fig. 4.

The side plates 10 on the rim section coöperate with the flat ring or spacer 11 on the hub section to hold the sections in vertical alinement with each other, and the cushion 4 which is interposed between said sections absorbs the shocks which the rim section receives when the wheel is in service, the side plates 10 of the rim section sliding or telescoping over the spacer 11 of the hub section. The open space or chamber in which the cushion is arranged is preferably filled with some suitable lubricating medium that will keep the rollers thoroughly lubricated and prevent the cushion from becoming unduly heated, and means is provided for preventing dirt, water and other foreign matter from working through the joints formed between the spacer 11 of the hub section and the side plates 10 of the rim section. The means herein shown for making the joints between said parts dust-proof and water-proof consists of a pair of rings 28 arranged inside of the ring-shaped spacer 11 of the hub section and bearing against the inner faces of the side plates of the rim section, and springs 29 or other suitable yielding devices for retaining said rings 28 in position or forcing them tightly against the spacer 11 and the side plates 10, as shown in Fig. 2. The packing rings 28 are covered with rubber or some suitable fibrous material, and each of the springs 29 consists of a piece of spring wire bent to form two coiled legs whose outer ends are connected together by the portion 29$^a$ which is bent so as to form a substantially U-shaped pocket that fits around the packing ring 28, the inner ends of said coiled legs projecting into the felly 3 of the hub section. Instead of connecting the springs 29 to the felly 3 in this manner, however, I can connect said springs to a ring 30 which is secured to the side face of the felly 3, as shown in Fig. 5.

A wheel of the construction above described is exceedingly resilient because the cushion which is interposed between the hub and rim sections is very large. Another desirable feature of such a wheel is that the hub section is provided with a hub and radially disposed spokes so that the external appearance of the wheel resembles an ordinary automobile wheel. Another desirable feature of such a wheel is that the side thrusts are applied to the rim section at a point quite close to the periphery of the wheel, this being made possible by reason of the fact that a comparatively large hub section is used.

The cushion of the wheel is arranged inside of a chamber that is dust and water-proof so that it is possible to keep said cushion and the rollers which travel on same thoroughly lubricated and free from dirt.

Another desirable feature of the wheel is that it comprises few parts so that it can be manufactured cheaply and maintained in working condition at a low cost.

Having thus described my invention, what I claim as new and desire to secure by Letters Patent is:

1. A resilient wheel having a hub section that consists of a hub, spokes and a felly connected together, a cushion mounted on said felly, a rim section having a felly that surrounds said cushion, bearing devices interposed between said cushion and the felly of the rim section and connected together in such a manner that they can shift or travel relatively to said cushion, ring-shaped side plates on said rim section which project inwardly toward said hub section, a spacing member on said hub section arranged between said side plates in sliding engagement with same, means for preventing dirt, water and other foreign matter from working through the joints between said side plates and spacing member, a box connected to the spokes of the hub section, a buffer arranged inside of said box, and a link pivotally connected to one of the side plates of the rim section and coöperating with said buffer.

2. A resilient wheel having a hub section that consists of a hub, spokes and a felly connected together, a cushion mounted on said felly, a rim section consisting of a felly that surrounds said cushion and side plates which project inwardly toward the hub section, a member on said hub section arranged between said side plates so as to hold said plates spaced away from each other, a hollow member connected to the felly and to the spokes of said hub section, a buffer arranged inside of said hollow member, and a link provided at one end with a device that coöperates with said buffer and at its opposite end with a device that projects into an opening in one of the side plates of the rim section.

3. A resilient wheel comprising a hub section provided with a substantially flat ring, a rim section having inwardly projecting side plates whose inner faces are arranged in sliding engagement with the side edges of said ring, a cushion arranged between said hub section and rim section in the chamber which said side plates and ring form, packing rings arranged inside of the flat ring on said hub section and bearing against the inner faces of the side plates of the rim section, and yielding devices connected to the hub section for forcing said packing rings tightly against said flat ring and side plates.

In testimony whereof I hereunto affix my signature in the presence of two witnesses, this twenty-ninth day of August 1910.

NICHOLAS SCHENK.

Witnesses:
WELLS L. CHURCH,
GEORGE BAKEWELL.